(12) United States Patent
Bayley

(10) Patent No.: US 6,364,960 B1
(45) Date of Patent: Apr. 2, 2002

(54) LAWN MOWER CLEANING APPARATUS AND METHOD

(76) Inventor: William T. Bayley, 2600 S. Sashabaw, Ortonville, MI (US) 48462

(*) Notice: Subject to any disclaimer, the term of this patent is extended or adjusted under 35 U.S.C. 154(b) by 0 days.

(21) Appl. No.: 09/505,277

(22) Filed: Feb. 16, 2000

(51) Int. Cl.$^7$ ............................................. B08B 3/02
(52) U.S. Cl. .......................... 134/34; 134/123; 134/198; 239/273; 239/DIG. 6
(58) Field of Search .......................... 134/34, 123, 172, 134/198; 239/273, 276, 279, DIG. 6; 56/12.1

(56) References Cited

U.S. PATENT DOCUMENTS

| | | | |
|---|---|---|---|
| 3,040,990 A | * | 6/1962 | Gotti ........................... 239/273 |
| 3,108,608 A | | 10/1963 | Mahowald |
| 3,322,347 A | | 5/1967 | Pierce |
| 3,856,028 A | | 12/1974 | Kehler |
| 4,762,278 A | | 8/1988 | Taylor |
| 4,784,327 A | | 11/1988 | Lund |
| 5,027,590 A | | 7/1991 | Stark |
| 5,042,242 A | | 8/1991 | Evans |
| 5,152,459 A | | 10/1992 | Boeh |
| 5,312,047 A | | 5/1994 | Akers |
| 5,477,583 A | | 12/1995 | Deloe |
| 5,499,492 A | | 3/1996 | Jameson |
| 5,651,242 A | | 7/1997 | Kittridge |
| 5,673,856 A | | 10/1997 | Krohn |

FOREIGN PATENT DOCUMENTS

CA 625488 * 8/1961 ............ 239/DIG. 6

* cited by examiner

*Primary Examiner*—Philip R. Coe
(74) *Attorney, Agent, or Firm*—Young & Basile, P.C.

(57) ABSTRACT

A spray cleaning apparatus discharges pressurized fluid through apertures or nozzles to clean debris and compacted grass clippings from an interior surface of a blade housing. The apparatus includes a hollow body defining a fluid passage with an inlet connectible to a source of fluid under pressure. At least one upwardly extending surface is provided for positioning the hollow body with respect to a wall of the blade housing such that at least a portion of the hollow body extends under the wall of the blade housing. An angled portion of an upper surface of the hollow body is positioned with respect to the at least one upwardly extending surface to expose the angled portion to an interior of the blade housing. A plurality of apertures extend through the angled portion for spraying pressurized fluid when the hollow body is connected to a source of pressurized fluid. The angled portion includes a self-centering concave surface with a curved leading edge. The angled portion transitions to a flat surface prior to the upwardly extending surface. The transition between the angled portion and the flat portion defines a curved transition line. The flat portion provides a landing for engagement with a bottom of the wall of the blade housing, when the wall of the blade housing is positioned against the upwardly extending surface of the deck-stop. The concave angled portion reduces the possibility of contact with the cleaning apparatus by the blades of the lawn mower during the cleaning process.

20 Claims, 2 Drawing Sheets

LAWN MOWER CLEANING APPARATUS AND METHOD

FIELD OF THE INVENTION

The present invention relates to a lawn mower cleaning device that can be placed below the mowing deck allowing water to be distributed upward into the housing enclosing the rotatable blade of the mower.

BACKGROUND OF THE INVENTION

A common problem of lawn mowers is the accumulation of cut grass particles to the underside of the lawn mower. Grass clippings can become compacted on the interior surface of the blade housing as an operator continues to mow a lawn. Extended use without cleaning can result in compacted grass particles obstructing movement of the cutting blade and reducing effectiveness of the mower. In order to remove grass particles from the interior surface of the blade housing, operators currently turn off the motor powering the rotation of the blade, and then tip the mower on one side to access the interior surface of the blade housing for cleaning purposes. Tipping the mower on one side can result in leakage of fluid, gasoline and/or lubricating oil, from the motor onto the ground which is undesirable with respect to the adverse environmental impact of repeated small volume leakage of such materials into the surrounding environment and water table. After tipping the mower on one side, the operator typically proceeds to manually remove the grass particles from the underside of the mower. Manual removal of grass particles from the interior surface of the blade housing incurs substantial risk of personal injury from the cutting blade, and potential damage to the mower.

Numerous devices have been proposed for cleaning lawn mowers while in an upright position. However, the proposed devices generally teach large stationary underground or platform configurations. Permanent installations and large cumbersome devices are undesirable for operators that require cleaning devices that can be used in different locations between jobs, or by operators who are unwilling to devote the area required for such installations. Other devices have been proposed for directing fluid into the interior of the blade housing. Some of these devices require permanent attachment of a cleaning device to the vertically depending skirt or sidewall of the blade housing. Such devices are time consuming to properly install and can possibly vibrate loose, creating the potential of coming into contact with the blades if the mower is running. Another device is a long flat unit that must be positioned so that it is held under both sides of the deck when used. This device requires a rectangular base with a pair of ends that extend further out than the width of the entire blade chamber to be cleaned. Considerable time and effort is required to properly position the device, since various sizes and shapes of decks can be encountered and there are no positioning stops provided to keep the device from vibrating out from under the deck edge into contact with the blades if the mower is running. Such an occurrence could damage or destroy the cleaning device and the blades of the lawn mower being cleaned.

SUMMARY OF THE INVENTION

It is desirable in the present invention to provide a portable, compact cleaning apparatus that can be easily slipped under a portion of the vertically depending skirt of the blade housing while engaging the outer exterior surface of the skirt to properly position the spray nozzles of the cleaning apparatus to direct pressurized fluid upwardly into the blade housing to clean the interior surface of compacted grass particles. It is desirable to provide a cleaning apparatus that is lightweight and simple to use. In addition, it is desirable for the cleaning apparatus according to the present invention to be capable of use with a wide variety of different lawn mower configurations. It is desirable to provide an effective spray pattern within the blade housing to achieve a sufficient cleaning action to remove compacted grass clippings from the interior surface. It is desirable to provide a cleaning apparatus capable of use without being anchored permanently or temporarily to the ground or deck. It is desirable to provide a cleaning apparatus that allows cleaning of the blade housing while the mower is in an upright orientation.

A cleaning apparatus according to the present invention includes a hollow body defining a fluid passage having an inlet connectible to a source of fluid under pressure. At least one upwardly extending surface is provided for positioning the hollow body with respect to an exterior wall of the blade housing such that at least a portion of the hollow body extends under the wall of the blade housing. Preferably, two upwardly extending surfaces or deck-stops are provided for positioning the hollow body with respect to the exterior wall of the blade housing. The surfaces help to position the cleaning apparatus so that water will spray into the spinning blades within the blade housing or deck. The lawn mower deck can be any one of a wide variety of shapes, from round to square, or with odd shaped corners, and the cleaning apparatus will be able to position properly against the blade housing with the deck-stops. The deck-stops are spaced apart from one another in the preferred configuration for the best positioning results. The deck-stops keep the unit from moving to far under the blade housing, and allows a small cleaning apparatus to be used with a variety of lawn mowers including multiple blade decks, like riding mowers. An angled portion of an upper surface of the hollow body is positioned with respect to the upwardly extending surface to expose the angled portion to an interior of the blade housing. The angled portion of the hollow body acts as a ramp during installation. The front edge of the cleaning apparatus must be sufficiently low to slide under the blade housing as the cleaning apparatus is pushed under the deck to ensure that the leading edge is well below the blades of the lawn mower so as to reduce any possibility of contact between the blades and the cleaning apparatus when the mower is running during the cleaning process. When the deck-stops of the cleaning apparatus are engaged with the exterior wall of the blade housing, the deck is seated on a flat portion of the cleaning apparatus between the deck-stops. A plurality of apertures or nozzles extend through the angled portion for spraying pressurized fluid when the hollow body is connected to a source of pressurized fluid. The apertures must cause water to spray up into the blade housing. The spinning blades in the housing in the presence of the spray from the apertures move the water across the deck with a "power wash" action. The hollow body can be manufactured by a twin sheet vacuum forming process followed by laminating the two sheets of plastic together to form a hollow chamber or passageway therebetween for delivery of pressurized fluid from an inlet to the discharge apertures or nozzles. Alternatively, the hollow body can be manufactured by an injection mold process, where two halves are molded and then bonded to one another. Preferably, the hollow body is manufactured by a blow molding process as a complete piece. Preferably, the hollow body is formed of a high molecular weight polyethylene. A handle can be formed in the cleaning apparatus by providing a surface defining an aperture or slot extending through the hollow body and disposed between the inlet and the upwardly extending surface. The handle can also be used to hang the unit from a hook on a wall for storage, and can include a small notch to assist in hanging the cleaning apparatus.

A method according to the present invention for cleaning a rotary lawn mower having a rotating blade carried by a carriage, where the carriage has a vertically depending skirt generally surrounding the blade, includes the steps of sliding a hollow body defining a fluid passage having an inlet connectible to a source of fluid under pressure under the vertically depending skirt, engaging at least one upwardly extending surface of the hollow body with respect to an exterior wall of the vertically depending skirt such that at least a portion of the hollow body extends under the wall of the skirt, and exposing an angled portion of an upper surface of the hollow body positioned with respect to the upwardly extending surface to an interior of the blade housing, wherein a plurality of apertures extend through the angled portion for spraying pressurized fluid when the hollow body is connected to a source of pressurized fluid.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
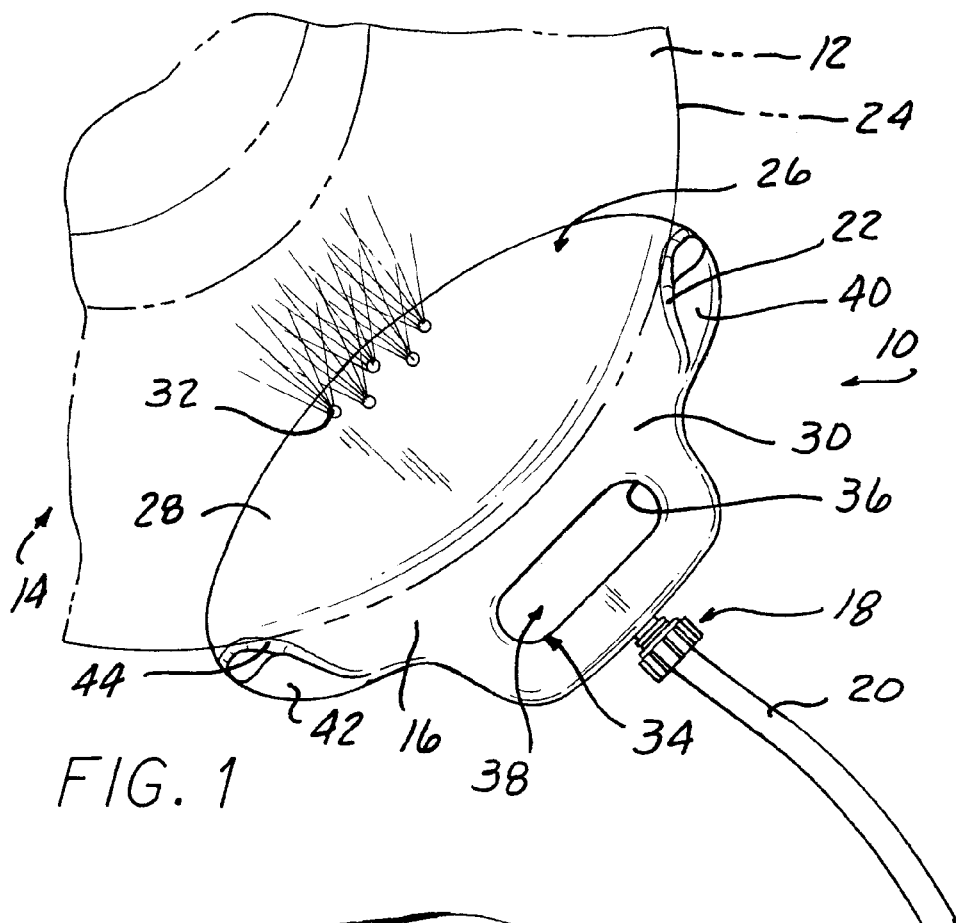
FIG. 1 is a plan view of a cleaning apparatus according to the present for removing grass particles from a rotary blade housing of a lawn mower, where the cleaning apparatus is connected to a source of fluid under pressure through a hose and positioned with respect to a rotary blade housing of a lawn mower.

An apparatus 10 is illustrated in FIG. 1 for cleaning a blade housing 12 of a lawn mower 14. The cleaning apparatus 10 includes a hollow body 16 defining a fluid passage having an inlet 18 connectible to a source of fluid under pressure, such as through a garden hose 20. At least one upwardly extending surface 22 is provided for positioning the hollow body 16 with respect to an exterior wall 24 of the blade housing 12, so that at least a portion 26 of the hollow body 16 extends under the wall 24 of the blade housing 12. An angled upper portion 28 of an upper surface 30 of the hollow body 16 is positioned with respect to the upwardly extending surface 22 to expose the angled portion 28 to an interior of the blade housing 12. A plurality of apertures 32 extend through the angled portion 28 of the upper surface 30 for spraying pressurized fluid when the hollow body 16 is connected to a source of pressurized fluid.

In the preferred embodiment, the hollow body 16 is formed of a high molecular weight polyethylene. The hollow body 16 can be formed by a blow molding process to form a fluid passage between an inlet and a plurality of apertures or nozzles forming an outlet. Preferably, a handle 34 is formed by surface 36 defining an aperture 38 extending through the hollow body 16. The handle 34 preferably is formed between the inlet 18 and the at least one upwardly extending surface 22.

The at least one upwardly extending surface 22 preferably includes first and second projections 40, 42 spaced apart from one another. The upwardly extending surface 22 can include a vertically extending curved surface 44 facing the blade housing 12. In the most preferred configuration, the at least one upwardly extending surface 22 includes a vertically extending curved surface 44 engageable with the wall 24 of the blade housing 12.

The hollow body 16 according to the present invention defines a spray cleaner with at least a portion, such as angled upper portion 28 of the upper surface 30, positionable below the blade housing 12 of a mowing deck of a lawn mower 14 to allow water to be distributed upwardly into an interior of the blade housing 12 enclosing a rotatable blade of the lawn mower 14. Preferably, the hollow body 16 has the upper surface 30 and a generally flat lower surface 46 spaced from the upper surface 30. The angled portion 28 of the upper surface 30 is disposed at a position opposite from the inlet 18 to the fluid passage defined by the hollow body 16. A transition between the angled portion 28 and the upper surface 30 can define a curved line 48 adjacent to the at least one upwardly extending surface 22 and generally following the contour of the blade housing 12 of the lawn mower 14. This configuration ensures that the angled portion 28 of the hollow body 16 is positioned below the blade housing 12.

Figure 5:
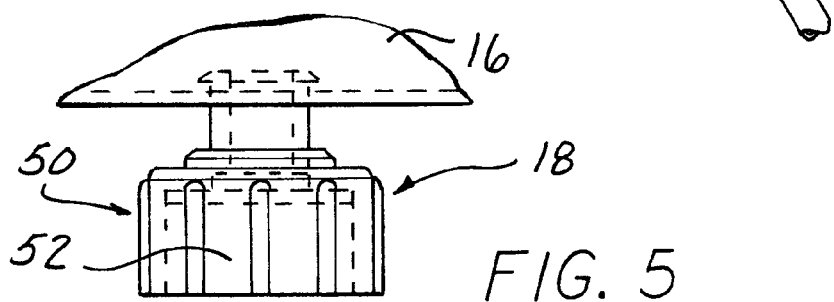
FIG. 5 is a detail view of an inlet coupling for connection with a threaded male hose adapter.
Figure 4:
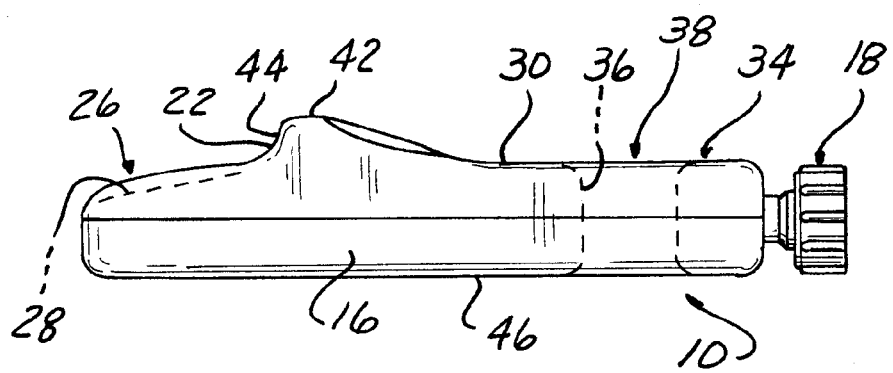
FIG. 4 is a side elevational view of the cleaning apparatus of FIG. 2.
Figure 2:
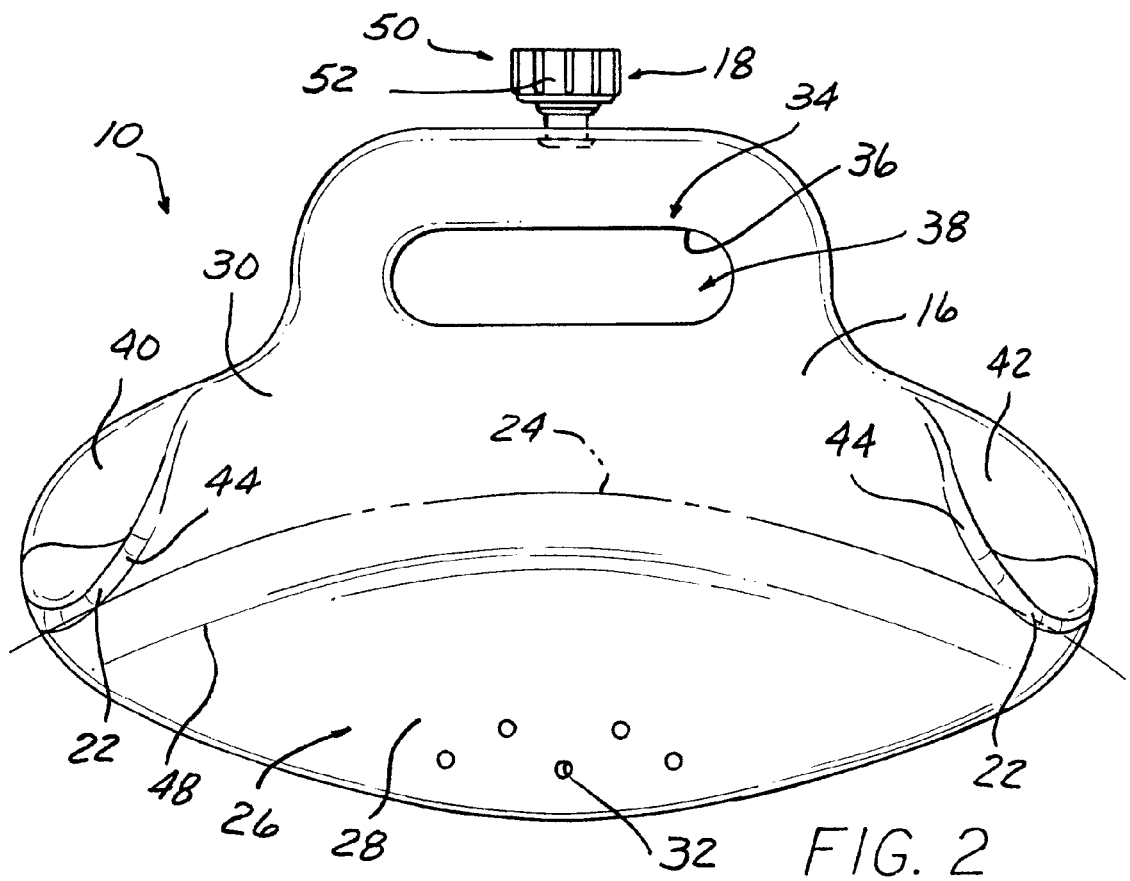
FIG. 2 is a plan view of the cleaning apparatus of FIG. 1.
Figure 6:
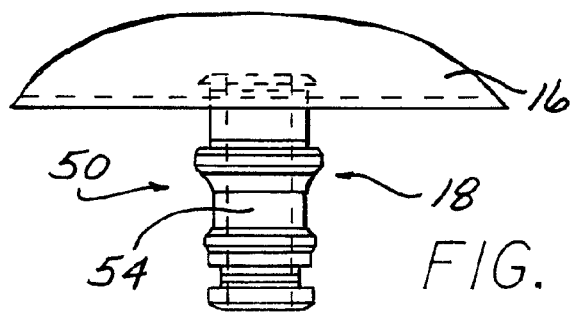
FIG. 6 is a detail view of an inlet coupling for connecting with a quick connect female hose adapter.
Figure 3:
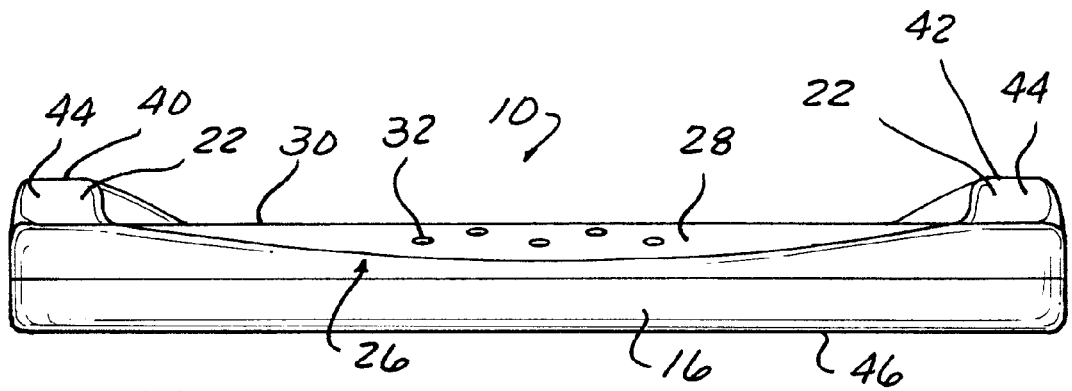
FIG. 3 is a front elevational view of the cleaning apparatus of FIG. 2.

The hollow body 16 can be placed in fluid communication with a pressurized source of fluid through inlet 18. The inlet 18 can include a standard water inlet coupling 50, such as a female threaded coupling for connecting with a threaded male hose adapter as commonly used in the United States, or a quick connect male coupling 54 for connecting with a quick connect female hose adapter as is commonly used in Europe. The female threaded coupling 52 configuration is shown in detail in FIG. 5. The quick connect male coupling 54 is shown in detail in FIG. 6.

An apparatus 10 according to the present invention is provided for cleaning mowing machinery, and is adapted for connection to the end of a hose 20, where the hose is in fluid communication with a pressurized supply of water. A hollow body 16 defines a fluid passage having an inlet 18 connectible to the source of fluid under pressure. The hollow body 16 preferably is formed of blow molded high molecular weight polyurethane. Preferably, the hollow body 16 has an upper surface 30 and a generally flat lower surface 46. The hollow body 16 is in fluid communication with the water inlet coupling 50 for connection to the pressurized source of fluid. The hollow body 16 defines a spray cleaner with at least a portion 28 positionable below the blade housing 12 of a mowing deck of the lawn mower 14 to allow water to be distributed upwardly into an interior of the blade housing enclosing a rotatable blade of the lawn mower 14. At least one upwardly extending surface 22 is provided for positioning the hollow body 16 with respect to an exterior wall 24 of the blade housing 12 so that at least the portion 28 of the hollow body 16 extends under the wall of the blade housing 12. Preferably, the upwardly extending surface 22 includes first and second projections 40, 42 spaced apart from one another. A handle 34 is formed by a surface 36 defining an aperture 38 extending through the hollow body 16. The handle 34 is preferably disposed between the inlet 18 and the first and second projections 40, 42. An angled portion 28 of an upper surface 30 of the hollow body 16 is positioned with respect to the projections to expose the angled portion 28 to an interior of the blade housing 12. A plurality of apertures or nozzles extend through the angled portion 28 for spraying pressurized fluid when the hollow body 16 is connected to the source of pressurized fluid.

The upwardly extending surface 22 can include a vertically extending surface 44 facing the blade housing 12 for engagement with the exterior wall 24 of the blade housing 12. The angled portion 28 of the upper surface 30 is preferably disposed at a position opposite from the inlet 18 to the fluid passage defined by the hollow body 16. A transition between the angled portion 28 and the upper surface 30 can define a curved line 48 extending adjacent to and between the first and second projections 40, 42.

The cleaning apparatus is self-centering when installed under the deck of a lawn mower. The present invention includes a combination of concave and convex shapes and surfaces to accomplish the self-centering function. The shape of the cleaning apparatus ensures that the apertures are located as far away from the blades as possible during use. The angled portion, or lead-in ramp, of the hollow body is a concave surface with a convex leading edge, and a curved back edge transitions to a flat surface prior to the deck-stops. The combination of surfaces ensure that the cleaning apparatus self-centers while being slid under the deck of a lawn mower, regardless of the size and shape of the deck to be cleaned. The flat portion in front of the deck-stops, between the deck-stops, and in back of the deck-stops on which the deck edge comes to rest accommodates a wide range of deck shapes and sizes with a single cleaning apparatus.

A method according to the present invention uses the apparatus 10 for cleaning a rotary lawn mower 14. The lawn mower 14 has a rotating blade carried by a carriage. The carriage can include a vertically depending skirt or exterior wall 24 generally surrounding the rotating blade. The cleaning method according to present invention can include the steps of sliding the hollow body 16 defining a fluid passage having an inlet 18 connectible to a source of fluid under pressure under the vertically depending skirt 24, engaging at least one upwardly extending surface 22 of the hollow body 16 with respect to an exterior wall of the vertically depending skirt 24 such that at least a portion of the hollow body 16 extends under the wall of the skirt 24, and exposing an angled portion 28 of an upper surface 30 of the hollow body 16 positioned with respect to the at least one upwardly extending surface 22 to an interior of the blade housing 12. A plurality of apertures 32 extend through the angled portion 28 of the upper surface 30 for spraying pressurized fluid when the hollow body 16 is connected to the source of pressurized fluid. The pressurized fluid sprayed within the interior of the blade housing 12 is of sufficient pressure and quantity in combination with the spinning blades to move the water at high velocity across the deck to clean debris and compacted grass clippings from the interior surface of the blade housing 12. The present invention can be used with lawn mowers of any size, from the push mowers to riding mowers with one or more blades, i.e. a multiple blade deck. The cleaning apparatus should be placed farthest from the grass discharge. The blades will move the water across the deck to the discharge side and in the process will clean the complete interior surface of the deck. Preferably, the cleaning apparatus is used after every mowing. While the engine is turned off, the cleaning apparatus is preferably positioned between the grass of the lawn and the mower deck during cleaning to squeeze or trap the hollow body between the grass and the deck. The trapping of the hollow body between the grass and the deck prevents undesirable movement of the cleaning apparatus that could occur if the gap between the deck and the supporting surface is too large during the cleaning process. After positioning the cleaning apparatus, the engine is turned on and water is supplied to the cleaning apparatus under pressure for a period of time. When the cleaning process is complete, the engine is turned off and the water is turned off before removing the cleaning apparatus from between the grass and the deck.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for cleaning a blade housing of a lawn mower comprising:

a hollow body defining a fluid passage having an inlet connectible to a source of fluid under pressure;

at least one upwardly extending surface for positioning the hollow body with respect to an exterior wall of the blade housing such that at least a portion of the hollow body extends under the wall of the blade housing; and an angled portion of an upper surface of the hollow body positioned with respect to the at least one upwardly extending surface to expose the angled portion to an interior of the blade housing, a plurality of apertures extending through the angled portion for spraying pressurized fluid when the hollow body is connected to a source of pressurized fluid.

2. The apparatus of claim 1 further comprising:

the hollow body formed of a high molecular weight polyethylene.

3. The apparatus of claim 1 further comprising:

the hollow body formed by blow molding.

4. The apparatus of claim 1 further comprising:

a handle formed by a surface defining an aperture through the hollow body disposed between the inlet and the upwardly extending surface.

5. The apparatus of claim 1 further comprising:

the at least one upwardly extending surface including first and second projections spaced apart from one another.

6. The apparatus of claim 1 further comprising:

the at least one upwardly extending surface including a vertically extending curved surface facing the blade housing.

7. The apparatus of claim 1 further comprising:

the at least one upwardly extending surface including a vertically extending surface engageable with the wall of the blade housing.

8. The apparatus of claim 1 further comprising:

the hollow body defining a spray cleaner with at least a portion positionable below the blade housing of a mowing deck of a lawn mower to allow water to be distributed upwardly into an interior of the blade housing enclosing a rotatable blade of the lawn mower.

9. The apparatus of claim 1 further comprising:

the hollow body having the upper surface and a generally flat lower surface spaced from the upper surface.

10. The apparatus of claim 1 further comprising:

the angled portion of the upper surface disposed at a position opposite from the inlet to the fluid passage defined by the hollow body.

11. The apparatus of claim 1 further comprising:

a transition between the angled portion and the upper surface defining a curved line adjacent the at least one upwardly extending surface.

12. The apparatus of claim 1 further comprising:

the hollow body in fluid communication with a water inlet coupling for connection to a pressurized source of fluid.

13. The apparatus of claim 12 further comprising:

the water inlet coupling including a female threaded coupling for connecting with a threaded male hose adapter.

14. The apparatus of claim 12 further comprising:

the water inlet coupling including a quick connect male coupling for connecting with a quick connect female hose adapter.

15. An apparatus for cleaning mowing machinery, being adapted for connection to the end of a hose, with the hose receiving a pressurized supply of water, the apparatus comprising:

a hollow body defining a fluid passage having an inlet connectible to a source of fluid under pressure, the hollow body formed of blow molded high molecular weight polyethylene, the hollow body having an upper surface and a generally flat lower surface, the hollow body in fluid communication with a water inlet coupling for connection to a pressurized source of fluid, the hollow body defining a spray cleaner with at least a portion positionable below the blade housing of a mowing deck of a lawn mower to allow water to be distributed upwardly into an interior of the blade housing enclosing a rotatable blade of the lawn mower;

at least one upwardly extending surface for positioning the hollow body with respect to an exterior wall of the blade housing such that at least a portion of the hollow body extends under the wall of the blade housing, the at least one upwardly extending surface including first and second projections spaced apart from one another;

a handle formed by a surface defining an aperture through the hollow body disposed between the inlet and the projections; and an angled portion of an upper surface of the hollow body positioned with respect to the projections to expose the angled portion to an interior of the blade housing, a plurality of apertures extending through the angled portion for spraying pressurized fluid when the hollow body is connected to a source of pressurized fluid.

16. The apparatus of claim 15 further comprising:

the water inlet coupling including a female threaded coupling for connecting with a threaded male hose adapter.

17. The apparatus of claim 15 further comprising:

the water inlet coupling including a quick connect male coupling for connecting with a quick connect female hose adapter.

18. The apparatus of claim 15 further comprising:

the at least one upwardly extending surface including a vertically extending curved surface facing the blade housing for engagement with the wall of the blade housing.

19. The apparatus of claim 15 further comprising:

the angled portion of the upper surface disposed at a position opposite from the inlet to the fluid passage defined by the hollow body, and a transition between the angled portion and the upper surface defining a curved line extending adjacent to and between the first and second projections.

20. A method for cleaning a rotary lawn mower having a rotating blade carried by a carriage, the carriage having a vertically depending skirt generally surrounding the blade, the cleaning method comprising the steps of:

sliding a hollow body defining a fluid passage having an inlet connectible to a source of fluid under pressure under the vertically depending skirt;

engaging at least one upwardly extending surface of the hollow body with respect to an exterior wall of the vertically depending skirt such that at least a portion of the hollow body extends under the wall of the skirt; and exposing an angled portion of an upper surface of the hollow body positioned with respect to the at least one upwardly extending surface to an interior of the blade housing, wherein a plurality of apertures extending through the angled portion are provided for spraying pressurized fluid when the hollow body is connected to a source of pressurized fluid.

* * * * *